(12) United States Patent
Heckendorf (10) Patent No.: US 6,651,801 B1
(45) Date of Patent: Nov. 25, 2003

(54) HORIZONTAL TO VERTICAL TRANSITION DEVICE FOR SORTATION CONVEYOR SYSTEM

(75) Inventor: Mark J. Heckendorf, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 10/205,036

(22) Filed: Jul. 25, 2002

(51) Int. Cl.[7] .............................................. B65G 47/24
(52) U.S. Cl. ...................................... 198/406; 198/532
(58) Field of Search ................................ 198/532, 560, 198/406, 370.06, 370.1; 414/798.8, 798.7

(56) References Cited

U.S. PATENT DOCUMENTS

| | | | |
|---|---|---|---|
| 1,449,027 A | 3/1923 | Allen | |
| 1,826,379 A | 10/1931 | Birkmeyer et al. | |
| 2,786,565 A | 3/1957 | Eckart | 198/33 |
| 3,831,784 A | * 8/1974 | Newell | 414/798.8 |
| 3,998,320 A | * 12/1976 | Eggert | 198/532 X |
| 4,058,226 A | 11/1977 | Peters, Jr. | 214/7 |
| 4,377,111 A | 3/1983 | Kincheloe et al. | 101/44 |
| 4,391,560 A | * 7/1983 | Fardin | 198/406 |
| 4,494,900 A | 1/1985 | Johnson et al. | 414/27 |
| 5,630,496 A | * 5/1997 | Mims | 198/406 X |
| 5,690,209 A | * 11/1997 | Kofoed | 198/370.06 |
| 6,179,112 B1 | 1/2001 | Ertel, Jr. | 198/411 |
| 6,296,437 B1 | 10/2001 | Remsing et al. | 414/801 |
| 6,302,638 B1 | 10/2001 | Eggebrecht et al. | 414/798.7 |

FOREIGN PATENT DOCUMENTS

| | | | | |
|---|---|---|---|---|
| DE | 829570 | * | 1/1952 | 198/406 |
| DE | 3317137 | * | 12/1983 | 198/406 |
| FR | 997703 | * | 1/1952 | 198/406 |
| FR | 1412417 | | 8/1965 | |
| JP | 6-48552 | * | 2/1994 | 198/406 |

* cited by examiner

*Primary Examiner*—James R. Bidwell
(74) *Attorney, Agent, or Firm*—Andrus, Sceales, Starke & Sawall, LLP (57) ABSTRACT

A transition station for a sortation conveying system for transitioning randomly discharged horizontal articles into a vertically oriented position for stacking. The transition station includes a transition plate having a curved outer surface extending from a generally horizontal first end to a generally vertical second end. The transition plate receives articles discharged from a supply source and directs the article onto an edge surface. A discharge chute is positioned beneath the second end of the transition plate to receive the article after it has been oriented onto an edge surface. The discharged chute directs the received article onto a discharge stacking station. The transition station includes a deflection hood spaced from the transition plate to define a product gap. The deflection hood contacts an article as it is discharge from the supply source and pivots between a first position and a second position to slow the article and direct the article onto the discharge chute.

21 Claims, 5 Drawing Sheets

HORIZONTAL TO VERTICAL TRANSITION DEVICE FOR SORTATION CONVEYOR SYSTEM

BACKGROUND OF THE INVENTION

The present invention relates to a sortation conveying system used to fulfill orders of intermingled articles such as assortments of books, video cassette containers, packaged software, compact disc containers, DVD containers or the like. More specifically, the present invention relates to a transition device for receiving horizontally supported discharged articles having a random orientation and directing the articles onto a vertically supported discharge stacking station for stacking the intermingled articles.

In large distribution applications, sortation conveying systems are used to fulfill orders of intermingled articles, such as assortments of books, video cassette containers, packaged software, DVD's, compact disc containers, etc. One method of effectuating a sortation conveying system is to utilize a cross-belt conveyer system that comprises a train of individual cars each including one or more conveyors that can be selectively operated to discharge the articles contained on each car into a selected collection bin. Assorted articles are loaded onto the individual cars of the conveyor system and bar code information for each respective article is read. Based upon this information, a programmable computer controls the operation of the individual belts on each conveyor car such that the belts discharge the articles into the correct collection bin. The collection bins receive the articles and accumulate the articles in an unstacked manner. Once an order has been filled, workers take the articles from the bin and pack the orders for distribution.

A second type of sortation conveying system is shown in U.S. Pat. Nos. 6,296,437 and 6,302,638, each of which are owned by the assignee of the present application and are incorporated herein by reference. In the systems shown in these patents, articles are conveyed in a single file order along an edge surface and the individual articles are directed to one of a plurality of discharge stacking stations. The discharge stacking stations create an ordered stack of articles each standing on its edge surface. When the appropriate number of articles are accumulated within the stacking station, a worker simply places the ordered stack into a container for shipping. As can be understood by the foregoing description and the subject matter of each patent, stacking the sorted articles minimizes damage to the articles being handled. Additionally, the ordered stack of intermingled articles increases the packing efficiency and reduces wasted space and packing times.

Although the sortation and stacking system shown in the '437 and '638 patents is effective in stacking articles received in a single file from a conveying system, the discharge stacking stations are currently unable to handle articles discharged in a random orientation and supported horizontally on one of the article's face surfaces. The conveying system described in each of the two prior patents provides articles to the discharge stacking station on edge such that discharge stacking station can create an ordered stack of articles. In a cross-belt conveyor system, articles are discharged with a random orientation and supported on one of the flat face surfaces.

Therefore, a need exists for a transition device to receive articles having a random orientation from a cross-belt conveyor system or other similar conveyor system. The transition device must redirect the articles from the random, horizontal orientation to a vertical orientation in which the article rests upon one of its edge surfaces. Once the article is oriented in the proper manner, the transition device needs to supply the article to the discharge stacking station for accumulation. Further, a need exists for a transition device that allows the articles to be fed at a high rate of speed and at a random orientation such that the transition device retards the movement of the article and presents the article in a condition to be stacked by the discharge stacking station.

SUMMARY OF THE INVENTION

The present invention is a transition station for receiving articles discharged from a supply conveyor assembly, such as a cross-belt conveyor. The articles discharged from the cross-belt conveyor have a random orientation and are generally horizontally oriented. The transition station of the present invention reorients each of the intermingled articles onto an edge surface. The intermingled articles from the transition station are transferred to a discharge stacking station for stacking the articles in a side-by-side condition for loading into a shipping container.

The transition station of the present invention includes a transition plate positioned to receive the discharged articles from the cross-belt conveyor. The transition plate has a curved outer surface that extends from a first end to a second end. The first end of the transition plate is generally horizontal and receives the dispensed articles.

As the dispensed articles move along the transition plate, the outer surface of the transition plate is curved from a generally horizontal orientation at the first end to a generally vertical orientation at the second end. The second end of the transition plate is spaced slightly above a discharge chute. The discharge chute is positioned to receive an edge surface of the article after the article has left the transition plate.

In the preferred embodiment of the invention, the discharge plate includes a bottom plate that is inclined to direct articles from the discharge chute to the discharge stacking station. The bottom plate of the discharge chute is preferably coated with a friction-reducing coating, such as teflon, to aid in the movement of articles along the discharge chute toward the discharge stacking station.

The transition station includes a deflection hood that is spaced from the transition plate to define a product gap. The deflection hood extends from a top end to a bottom end and includes a curved inner surface. The curved inner surface is spaced from the transition plate to define the product gap.

The deflection hood is pivotally mounted between a pair of side brackets such that the deflection plate can pivot upon contact with an article discharged from the supply conveyor assembly. The deflection hood is mounted between the pair of side brackets such that the weight of the deflection hood biases the deflection hood into a first position. When the deflection hood is in the first position, the product gap has its minimum width. In the preferred embodiment of the invention, a movement limiting bracket is attached to the back surface of the deflection hood to define the first position.

As an article contacts the deflection hood, the deflection hood pivots from the first position to the second position. When the deflection hood is in the second position, the product gap has its maximum width. In the preferred embodiment of the invention, a pivot stop member is included on the transition station to contact the back surface of the deflection hood to define the second position for the deflection hood.

The product gap defined by the deflection hood and the transition plate directs articles from the transition plate to the discharge chute. The pivoting movement of the deflection hood absorbs the inertia of the article and allows the article to be supported by its edge surface. The deflection hood directs the article to the discharge stacking station for accumulation in a side-by-side stack.

The product gap defined by the deflection hood and the transition plate can vary between the minimum width when the deflection hood is in the first position and the maximum width when the deflection hood is in its second position. Preferably, the maximum width of the product gap is less than the width and height of each type of article being sorted such that the articles can pass through the product gap only with one of the edge surfaces leading. Thus, after the article passes through the product gap, one of the edge surfaces is directed into contact with the discharge chute such that the article can be properly stacked by the discharge stacking station.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
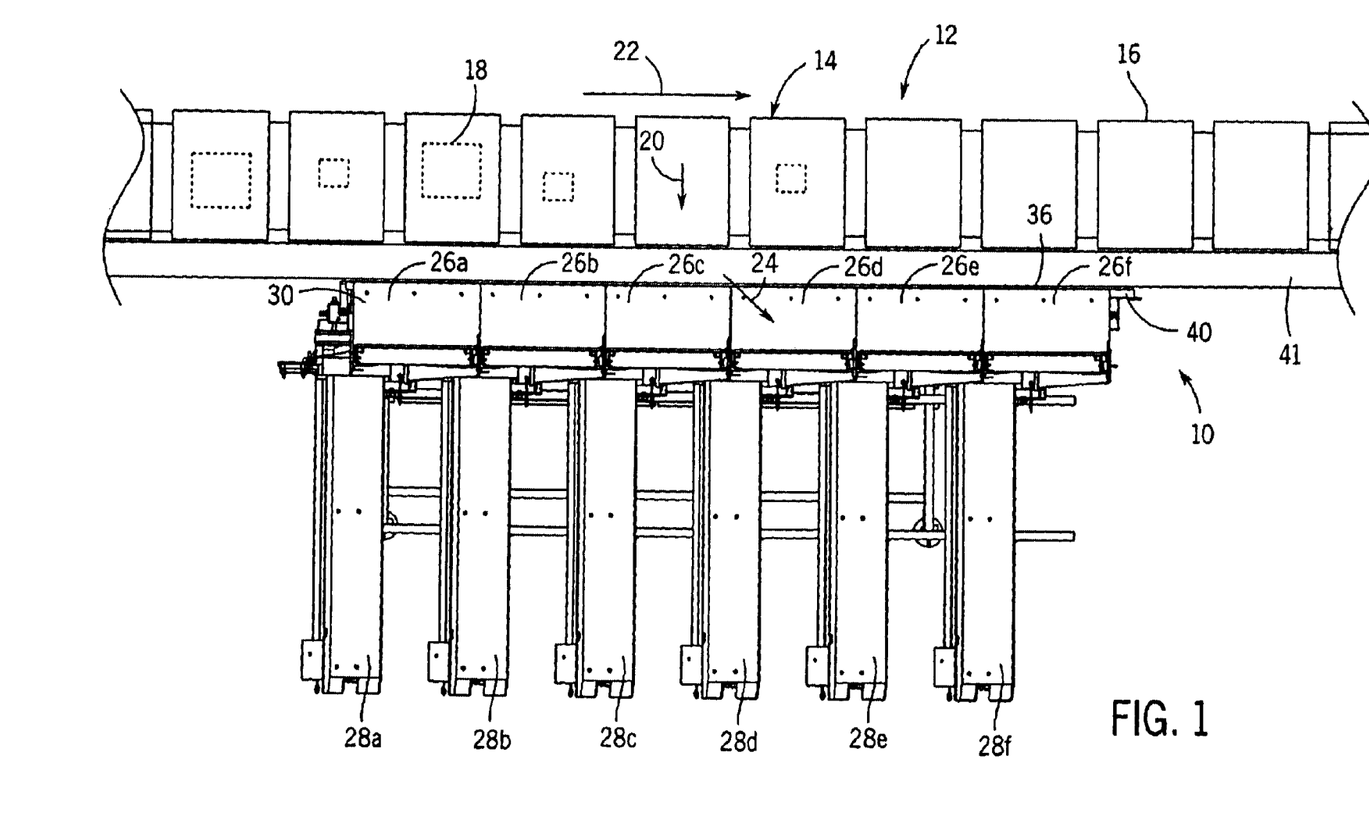
FIG. 1 is a schematic top view of a sortation conveying system that includes a cross-belt conveyor for discharging articles onto a transition device, which directs the articles into one of a plurality of discharge stacking stations.

FIG. 1 illustrates a sortation conveying system 10 that is capable of fulfilling orders of intermingled articles having assorted sizes, such as assorted books, intermingled with video cassette containers, DVD containers, compact disc containers, packaged software, and the like. The sortation conveying system 10 includes a product supply conveyor assembly 12 that extends for the entire length of the sortation conveying system 10. In the embodiment of the invention illustrated in FIG. 1, the supply conveyor assembly is a cross-belt conveyor 14 having a plurality of individual cars 16 joined to each other to define a continuous train-like structure.

Although a cross-belt conveyor 14 is shown in the Figures, it should be understood that the supply conveyor assembly 12 could also be other types of conveyor systems that are capable of directing articles in the direction shown by arrow 20. For example, a tilt tray conveyor system is contemplated as being a replacement for the cross-belt conveyor 14 shown in FIG. 1.

Although not shown in FIG. 1, the cross-belt conveyor 14 passes through an induction section where individual articles 18 are placed upon each of the individual cars 16. The bar code on each of the articles is read into a computer controller system such that the computer controller for the conveyor system knows the specific type of article 18 contained on each of the cars 16.

Each of the cars 16 includes a selectively operable conveyor belt that can be operated to discharge one of the intermingled articles 18 off of its respective car 16 in the direction shown by arrow 20. As the cross-belt conveyor 14 moves through the sortation conveying system 10, the computer controller activates the conveyor on each car to discharge the article at the desired location. As illustrated in FIG. 1, the entire cross-belt conveyor 14 is moving in the direction shown by arrow 22 such that as when article 18 is discharged, the article is moving in both a lateral and forward direction, as illustrated by arrow 24.

Although the cross-belt conveyor 14 shown in FIG. 1 is illustrated as directing articles only in the direction of arrow 20, it should be understood that the cross-belt conveyor 14 can also be configured to direct articles in an opposite direction. As can be understood by the above description and FIG. 1, articles discharged from each of the cars 16 of the cross-belt conveyor 14 are discharged from the cross-belt conveyor 14 in a random fashion. Most of the articles being dispensed by the cross-belt conveyor 14 are rectangular containers having a front face surface and a back face surface. When an article 18 is dispensed from the cross-belt conveyor 14, the article is on one of its face surfaces but is discharged without any control over the orientation of the product. As described previously, in prior art systems articles discharged from the cross-belt conveyor 14 are received in a large bin that collects the required number of articles to fulfill an order. When the order is filled, the bin or box is closed with the articles in an unorganized and unstacked state.

Referring back to FIG. 1, the sortation conveying system 10 of the present invention includes a plurality of transition stations 26a–26f that are each configured to direct the discharged articles 18 into one of the discharge stacking stations 28a–28f. Each of the discharge stacking stations 28a–28f is configured to receive and stack up to 100 sorted articles. The discharge stacking stations 28 are disclosed and described in U.S. Pat. Nos. 6,296,437 and 6,302,638, the disclosures of which is incorporated herein by reference.

Each of the transition stations 26a–26f is configured to transition the discharged articles 18 from a generally horizontal orientation to a vertical orientation for stacking by the discharge stacking stations 28a–28f. Each of the discharge stacking stations 28a–28f is configured to stack the articles on one of the edge surfaces. Therefore, the transition stations 26a–26f must receive the articles moving in the direction shown by arrow 24, stop movement of the article, and reposition the article from a horizontal orientation to a vertical orientation.

Although FIG. 1 illustrates six separate transition stations 26a–26f and discharge stacking stations 28a–28f, it should be understood that the sortation conveying station 10 of the present invention typically includes a much larger number of both transition stations 26 and discharge stacking stations 28 aligned as illustrated in FIG. 1.

Figure 2:
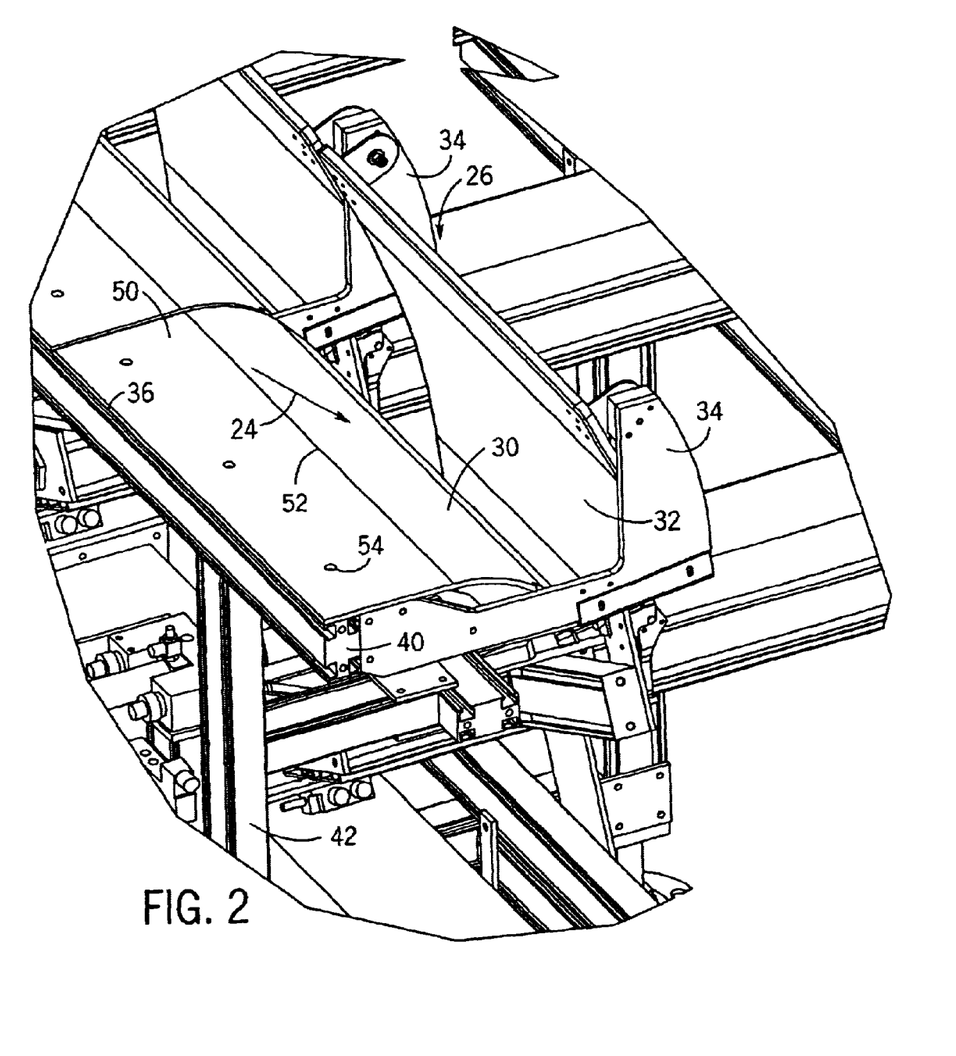
FIG. 2 is a perspective view illustrating the transition device for directing discharged articles into the discharged stacking station.
Figure 3:
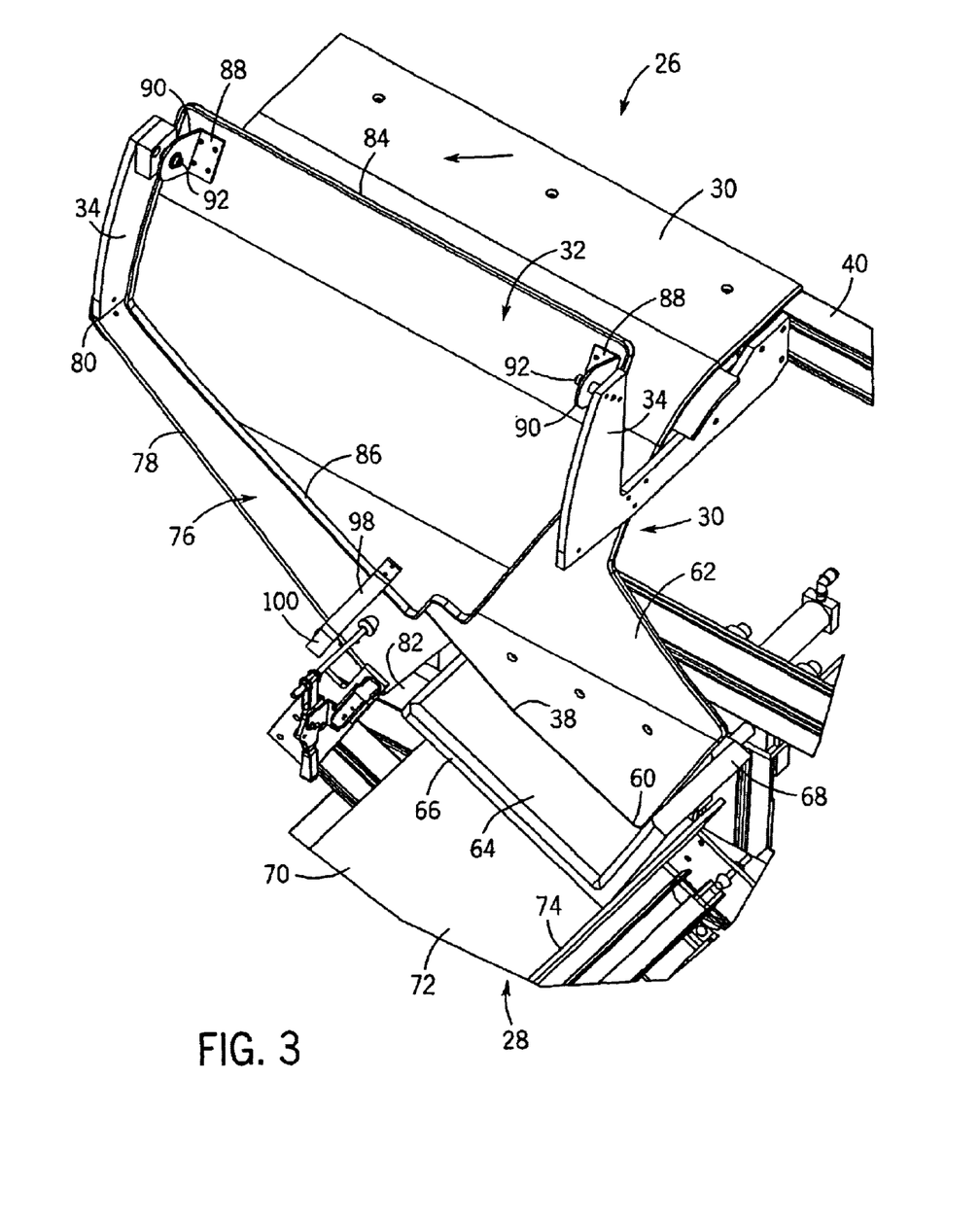
FIG. 3 is a rear perspective view illustrating the deflection hood and transition plate used to direct articles into the discharge stacking station.
Figure 4:
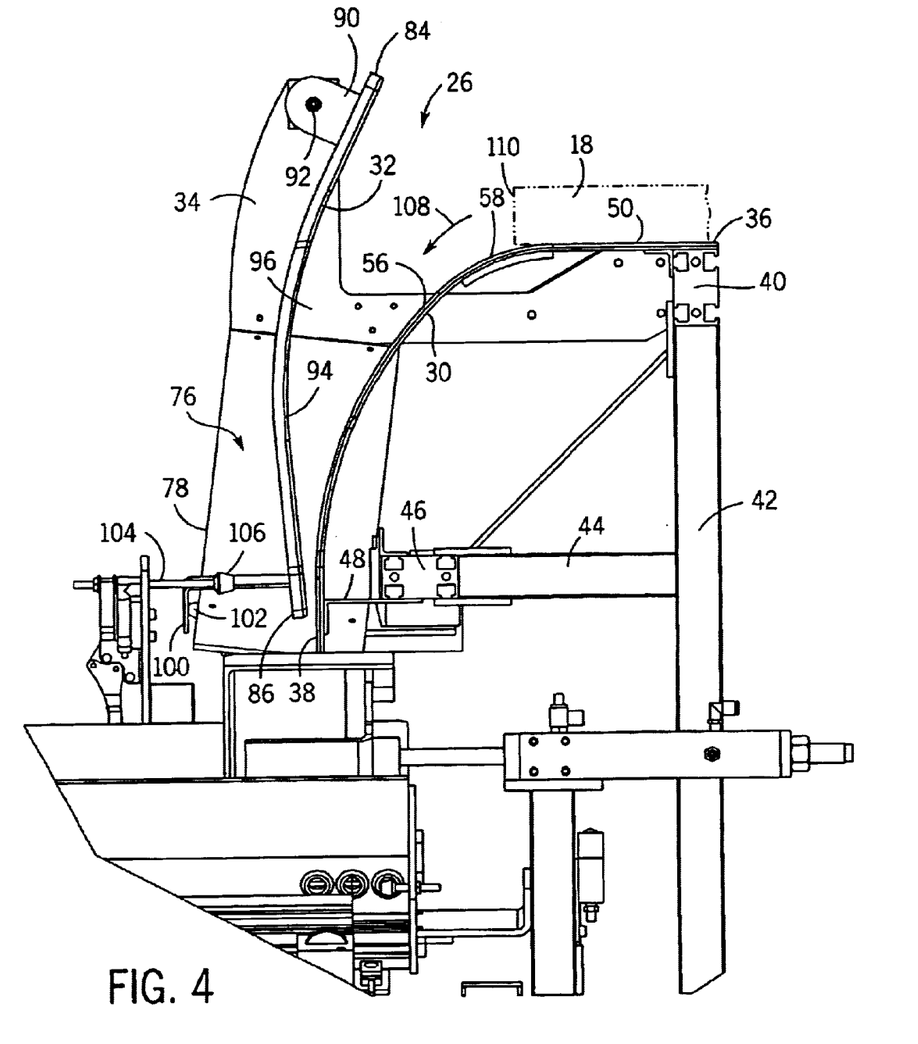
FIG. 4 is a side view illustrating the orientation of the deflection hood and the transition plate relative to an article as the article is discharged from the cross-belt conveyor.

FIGS. 2–4 illustrate one of the transition stations 26 of the present invention with the other transitions stations being identical thereto. The transition station 26 generally includes a transition plate 30 and a deflection hood 32 pivotally mounted between a pair of side support brackets 34.

Referring now to FIG. 4, the transition plate 30 extends from a first end 36 to a second end 38. The first end 36 has a generally horizontal orientation, while the second end 38 has a generally vertical orientation. The first end 36 is mounted to horizontal support rail 40 that extends parallel to the direction of movement of the cross-belt conveyor 14, as illustrated in FIG. 1. The first end 36 of each transition plate 30 is adjacent to a transfer plate 41 positioned between the cross-belt conveyor 14 and the transition stations 26a–26f. The transfer plate 41 is a flat, inclined metal plate positioned to transfer articles 18 from the cross-belt conveyor 14 to the transfer stations 26a–26f.

The horizontal rail 40 is supported on the ground of the workspace by a series of vertical legs 42. Horizontal cross-supports 44 are mounted to the vertical legs 42 to support rail 46. The rail 46 includes a mounting bracket 48 to which the second end 38 of the transition plate 30 is connected.

Referring back to FIG. 2, the transition plate 30 includes a horizontal induction section 50 that extends from the first end 36 to a transition area 52. The induction section 50 is mounted to the support rail 40 by a series of recessed connectors that pass through holes 54.

Referring back to FIG. 4, the induction section 50 is generally horizontal over its entire length and directs each article 18 onto a curved transition section 56. As illustrated in FIG. 4, the curved transition section 56 and the induction section 50 are formed as an integral component. Preferably, the entire transition plate 30 is formed from a durable plastic material having a smooth outer surface 58 that allows the article 18 to slide from the first end 36 to the second end 38.

Referring now to FIG. 3, the second end 38 of the transition plate 30 is inclined from a lower corner 60 to an upper corner (not shown). Specifically, the transition plate 30 includes an extended flap 62 that is spaced slightly above the reciprocating stacking member 64 of the discharge stacking station 28. The reciprocating stacking member 64 includes a floor 66 and a backstop wall 68 that extends perpendicularly upward from the floor 66.

The floor 66 of the stacking member 64 is sized to receive a side edge of an article. When the article is supported by the stacking member 64, the stacking member 64 is retracted and the article is supported on the accumulation tray 70. Specifically, the accumulation tray 70 includes an inclined bottom wall 72 and a back wall 74. The accumulation tray 70 is used to support the accumulated stack of intermingled articles.

Referring back to FIGS. 3 and 4, the transition plate 30 directs articles 18 onto a discharge chute 76. The discharge chute 76 directs articles from the transition plate 30 downward onto the stacking member 64, as best seen in FIG. 3. In the preferred embodiment of the invention, the discharge chute 76 includes an inclined bottom plate 78 that extends from an upper end 80 to a lower end 82. As can be seen in FIG. 3, the lower end 82 of the bottom plate 78 is spaced slightly from the floor 66 of the stacking member 64 such that articles are directed onto the stacking member 64. In the preferred embodiment of the invention, the width of the bottom plate 78 measured from the transition plate is the same or greater than the width of the floor 66 from the transition plate such that articles freely slide onto the stacking member 64 from the discharge chute 76.

In the preferred embodiment of the invention, the bottom plate 78 is formed from Teflon-coated aluminum to reduce the friction between an article and the bottom plate 78. Since the bottom plate 78 is inclined from the lower end 82 to the upper end 80, the force of gravity aids in directing articles downward onto the stacking member 64. Although the continuous bottom plate 78 is shown in the preferred embodiment of the invention, it is contemplated by the inventor that other types of friction reducing members, such as a series of rollers, could replace the bottom plate while operating within the scope of the present invention.

As can be seen in FIG. 3, the upper end 80 of the bottom plate 78 is supported by one of the side support brackets 34.

Figure 5:
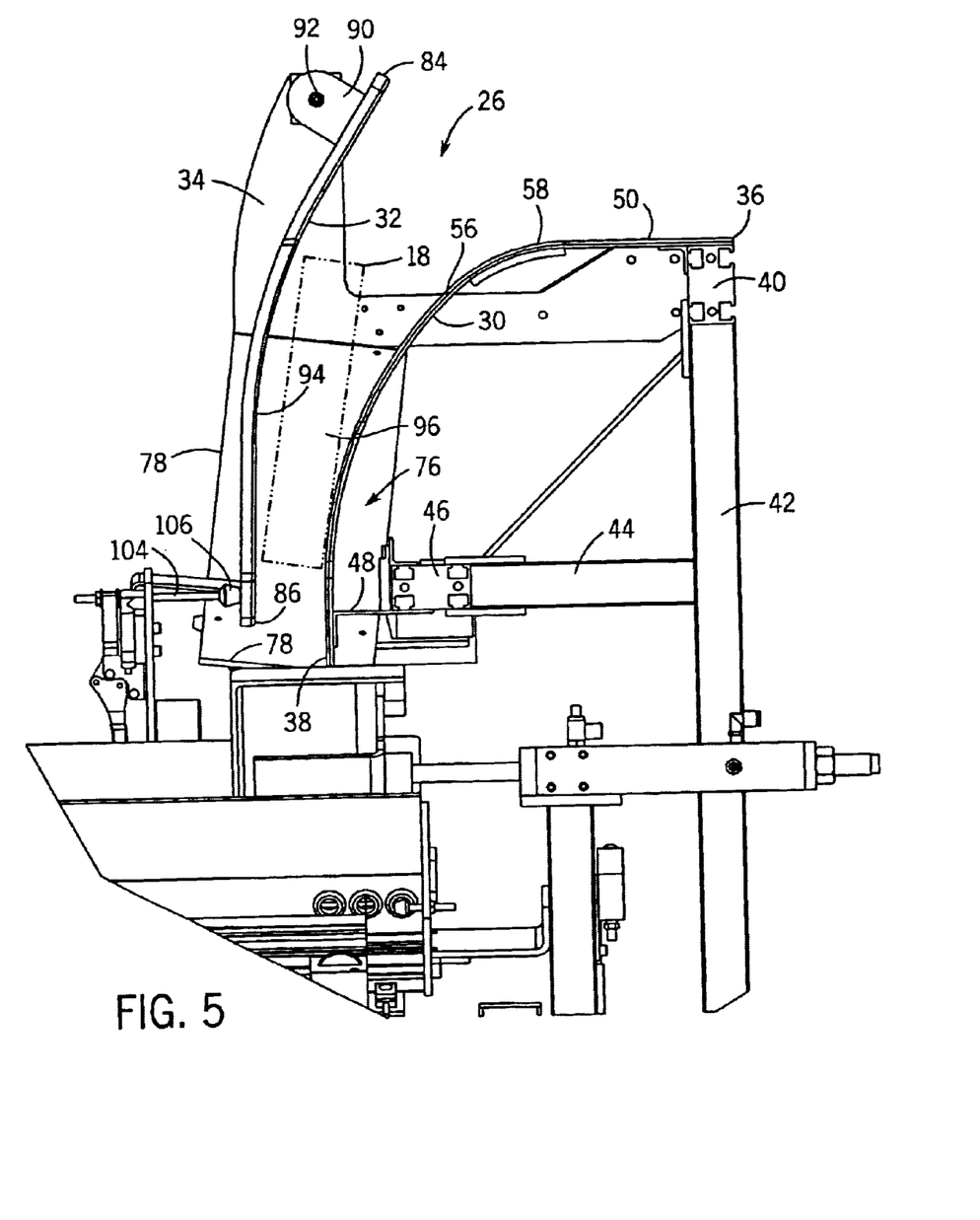
FIG. 5 illustrates an article passing between the deflection hood and the transition plate prior to being stacked by the stacking station.

Referring now to FIGS. 3 and 4, the deflection hood 32 is pivotally mounted between the pair of spaced support brackets 34. The deflection hood 32 extends from an upper end 84 to a lower end 86 and is preferably formed from a durable plastic material. The lower end of the deflection hood 32 is inclined at an angle corresponding to the incline of the bottom plate 78. As can be seen in FIGS. 4 and 5, the lower end 86 of the deflection hood 32 is spaced slightly above the bottom plate 78 such that the deflection hood 32 is free to move along the width of the bottom plate 78.

As illustrated in FIG. 3, the deflection plate 32 includes a pair of mounting brackets 88 secured to the back surface of the deflection hood 32. Each of the mounting brackets 88 includes a tab 90 extending generally perpendicular to the back surface of the deflection plate 32 and including a mounting hole that receives a pivot rod 92. The pivot rod 92 passes through the tab 90 and supports the tab 90 on one of the side support brackets 34. The pair of pivot rods 92 allow the entire deflection hood 32 to pivot along a pivot axis defined by the pair of pivot rods 92.

In the preferred embodiment of the invention, the position of the pivot rods 92 and the length of the mounting tabs 90 are selected such that the weight of the deflection hood 32 biases the deflection hood 32 into the first position shown in FIG. 4. As shown in FIG. 4, the spacing between the inner surface 94 of the deflection hood and the outer surface 58 of the transition plate creates a product gap 96. When the deflection hood 32 is in its first position as shown in FIG. 4, the width of the product gap 96 decreases from the first end 36 of the transition plate 30 to the second end 38.

Referring now to FIG. 3, the deflection hood 32 includes a movement limiting bracket 98 mounted to the back surface. As shown in FIG. 4, the movement limiting bracket 98 includes a flange 100 that contacts a bumper 102 contained on the bottom plate 78. The contact between the flange 100 and the bumper 102 limits the inward pivoting movement of the deflection hood 32 to define the first position of the deflection hood shown in FIG. 4.

Referring back to FIGS. 3 and 4, the transition station 26 further includes a pivot stop member 104. The pivot stop member 104 includes a bumper 106. The bumper 106 contacts the back surface of the deflection hood 32 when an article 18 passes between the deflection hood 32 and the transition plate 30, as shown in FIG. 5. The bumper 106 is adjustable along the pivot stop member 104 such that the bumper 106 and the pivot stop member 104 define a second position for the deflection hood 32, illustrated in FIG. 5. The second position for the deflection hood 32 defines the maximum width of the product gap and thus the maximum width of articles that can pass between the deflection hood 32 and the transition plate 30, as illustrated. In the preferred embodiment of the invention, the position of the bumper 106 can be manually adjusted depending upon the type of articles being stacked by the sortation conveying system 10 of the present invention. Preferably, the maximum width of the product gap is selected such that the articles being stacked can pass through the product gap only with one of the edge surfaces leading. As discussed previously, the articles must be supported on the discharge chute on one of the edge surfaces for the articles to be properly stacked by the stacking stations.

Operation of the present invention will now be described in connection with the Figures. As illustrated in FIG. 1, the cross-belt conveyor 14 is traveling in the direction shown by arrow 22 and includes articles 18 positioned on various cars 16. When each of the cars 16 approaches the desired discharge stacking station 28a–28f for the article 18, the computer controller associated with the cross-belt conveyor 14 activates the conveyor belt on the car to discharge the article in the direction shown by arrow 20.

As each article 18 is discharged from the cross-belt conveyor 14, the article passes over the transfer plate 41 and enters into one of the transfer stations 26a–26f. As illustrated, each of the transfer stations 26a–26f is associated with one of the discharge stacking stations 28a–28f. The computer controller for the cross-belt conveyor 14 takes into account the forward motion of the conveyor such that each article 18 is received by the correct transition station 26a–26f for the discharge stacking station that needs the product being stacked.

Referring now to FIG. 4, the article 18 is initially received upon the induction section 50 of the transition plate 30. The forward movement of the article, as illustrated by arrow 108, allows the article to enter into the product gap 96. As the article continues to move, the leading edge 110 of the article contacts the inner surface 94 of the deflection hood 32, as illustrated in FIGS. 4 and 5.

The deflection hood 32 contacts the leading edge 110 and deflects away from the transition plate 30 to absorb the forward momentum of the article 18. In this manner, the deflection hood 32 slows the forward movement of the article and directs the article downward through the product gap 96.

As can be understood best in FIG. 5, the deflection hood 32 directs the article 18 into a vertical position in which an edge of the article 18 is supported upon the bottom plate 78 of the discharge chute 76. In this manner, the combination of the transition plate 30 and the deflection hood 32 are able to change the article orientation from a horizontal orientation to a vertical orientation in which the article is supported on one of its edges by the bottom plate 78.

As described previously, the bumper 106 and pivot stop number 104 contact the deflection hood 32 to limit the deflection of the deflection hood 32. This contact defines the maximum width of the product gap 96.

Referring now to FIG. 3, after the article 18 is supported on the bottom plate 78, gravity directs the product onto the stacking member 64. Specifically, an edge surface of the product 18 is supported along the floor 66, while the backstop wall 68 contacts another of the articles edge surfaces.

Once the article is supported by the stacking member 64, the stacking member 64 is retracted to add the article to the accumulated stack on the accumulation tray 70.

As can be understood by the above description, the transition station 26 of the present invention is able to reorient random articles 18 received from a supply conveyor assembly. The transition station directs intermingled articles to a discharge stacking station without requiring the intermingled articles to enter into the transition station at a known orientation. Therefore, the transition station is able to operate with various types of supply conveyor assemblies that do not provide articles at a known orientation.

Various alternatives and embodiments are contemplated as being within the scope of the following claims particularly pointing out and distinctly claiming the subject matter regarded as the invention.

I claim:

1. A device for receiving articles discharged from a supply source and transferring the articles to a discharge stacking station, the device comprising:

a transition plate positioned to receive articles as the articles are discharged from the supply source, the transition plate having a curved outer surface extending from a generally horizontal first end to a generally vertical second end;

a discharge chute positioned adjacent to the second end of the transition plate and configured to receive articles from the transition plate, the discharge chute being positioned to direct the articles into the discharge stacking station; and a deflection hood spaced from the transition plate to define a product gap, the product gap being sized to allow articles to pass between the deflection hood and the transition plate, the deflection hood being positioned to direct articles into the discharge chute, wherein the discharge chute includes an inclined bottom plate such that the inclined bottom plate directs articles into the stacking station by gravity, and wherein the bottom end of the deflection hood is spaced from the bottom plate of the discharge chute such that the bottom end of the deflection hood can move along the bottom plate.

2. The device of claim 1 further comprising a transfer plate positioned between the transition plate and the supply source to receive the articles as the articles are discharged from the supply source and to direct the articles onto the transition plate.

3. The device of claim 1 wherein the bottom plate includes a friction reducing coating to aid in directing articles into the stacking station by gravity.

4. A device for receiving articles discharged from a supply source and transferring the articles to a discharge stacking station, the device comprising:

a transition plate positioned to receive articles as the articles are discharged from the supply source, the transition plate having a curved outer surface extending from a generally horizontal first end to a generally vertical second end;

a discharge chute positioned adjacent to the second end of the transition plate and configured to receive articles from the transition plate, the discharge chute being positioned to direct the articles into the discharge stacking station; and a deflection hood spaced from the transition plate to define a product gap, the product gap being sized to allow articles to pass between the deflection hood and the transition plate, the deflection hood being positioned to direct articles into the discharge chute, wherein the discharge chute includes an inclined bottom plate including a series of spaced rollers to aid in directing articles into the stacking station by gravity.

5. A device for receiving articles discharged from a supply source and transferring the articles to a discharge stacking station, the device comprising:

a transition plate positioned to receive articles as the articles are discharged from the supply source, the transition plate having a curved outer surface extending from a generally horizontal first end to a generally vertical second end;

a discharge chute positioned adjacent to the second end of the transition plate configured to receive articles from the transition plate, the discharge chute being positioned to direct the articles into the discharge stacking station; and a deflection hood spaced from the transition plate to define a product gap, the product gap being sized to allow articles to pass between the deflection hood and the transition plate, the deflection hood being positioned to direct articles into the discharge chute, wherein the deflection hood is curved from a top end to a bottom end and is pivotable between a first position and a second position, wherein the product gap increases as the deflection hood moves from the first position to the second position.

6. The device of claim 5 further comprising a pair of spaced side supports positioned to pivotally support the deflection hood, wherein the side supports define an induction opening for the device.

7. The transition station of claim 6 wherein the discharge chute includes a bottom plate inclined to direct articles into the discharge stacking station by gravity.

8. The device of claim 5 further comprising a stop member positioned to contact the deflection hood as the deflection plate moves from the first position to the second position.

9. The device of claim 8 wherein the stop member contacts the deflection hood to define the second position.

10. The device of claim 9 wherein the stop member is, adjustable to define the maximum product gap when the deflection hood is in the second position.

11. The device of claim 10 wherein the article has a length, a width and a thickness, wherein the maximum product gap is less than the product length and width and is greater than the product thickness.

12. The device of claim 7 wherein the bottom plate includes a friction reducing coating to aid in directing articles into the stacking station by gravity.

13. The device of claim 7 wherein the bottom plate includes a series of spaced rollers to aid in directing articles into the stacking station by gravity.

14. The transition station of claim 12 wherein the friction-reducing outer coating is Teflon®.

15. A transition station for receiving articles discharged from a cross-belt conveyor having a random orientation and transferring the articles to a discharge stacking station for stacking the articles in a side-by-side condition, the transition station comprising:

a transition plate having a first end positioned to receive the discharged articles from the cross-belt conveyor, the transition plate having a curved outer surface extending from a first end to a second end, the first end having a generally horizontal orientation and the second end having a generally vertical orientation;

a discharge chute positioned adjacent to the second end of the transition plate and configured to receive articles from the transition plate, the discharge chute being positioned to transfer articles from the transition plate to the discharge stacking station; and a deflection hood spaced from the transition plate to define a product gap, the product gap being sized to allow articles to pass between the deflection hood and the transition plate, the deflection plate having a bottom end positioned to direct articles onto the discharge chute.

16. The transition station of claim 15 wherein the deflection hood is curved from a top end to a bottom end.

17. The transition station of claim 16 wherein the deflection hood is pivotable between a first position and a second position, wherein the product gap increases as the deflection hood moves from the first position to the second position.

18. The transition station of claim 17 further comprising a stop member positioned to contact the deflection hood as the deflection hood moves from the first position to the second position, wherein the stop member contacts the deflection hood to define the second position.

19. The transition station of claim 17 wherein the deflection hood is mounted between a pair of spaced side supports such that the deflection hood is pivotable relative to the spaced side supports, wherein the deflection hood pivots from the first position to the second position upon contact with an article discharged from the cross-belt conveyor.

20. The transition station of claim 19 wherein the deflection hood is mounted to the spaced side supports such that the weight of the deflection hood biases the deflection hood into the first position.

21. The transition station of claim 20 further comprising a movement limiting bracket attached to the deflection hood to limit the pivoting movement of the deflection hood to define the first position.

* * * * *